(12) United States Patent
Mao et al.

(10) Patent No.: US 7,378,068 B2
(45) Date of Patent: May 27, 2008

(54) ELECTROCHEMICAL PROCESS FOR DECOMPOSITION OF HYDROGEN SULFIDE AND PRODUCTION OF SULFUR

(75) Inventors: Zhenhua Mao, Ponca City, OK (US); Shang Y. Chen, Edmond, OK (US)

(73) Assignee: ConocoPhillips Company, Houston, TX (US)

( * ) Notice: Subject to any disclaimer, the term of this patent is extended or adjusted under 35 U.S.C. 154(b) by 354 days.

(21) Appl. No.: 11/141,915

(22) Filed: Jun. 1, 2005

(65) Prior Publication Data

US 2006/0275193 A1 Dec. 7, 2006

(51) Int. Cl.
*C01B 17/04* (2006.01)
*C25B 1/00* (2006.01)

(52) U.S. Cl. ............ 423/220; 423/224; 423/225; 423/573.1; 205/554; 205/617

(58) Field of Classification Search ........ 423/220, 423/224, 225, 573.1; 205/554, 617
See application file for complete search history.

(56) References Cited

U.S. PATENT DOCUMENTS

| | | |
|---|---|---|
| 3,249,522 A | 5/1966 | Bolmer |
| 3,409,520 A | 11/1968 | Bolmer |
| 3,932,584 A | 1/1976 | Asakusa et al. |
| 4,007,109 A | 2/1977 | Baird, Jr. et al. |
| 4,007,110 A | 2/1977 | Bearden, Jr. |
| 4,024,229 A | 5/1977 | Smith et al. |
| 4,038,366 A | 7/1977 | Fukuda et al. |
| 4,073,832 A | 2/1978 | McGann |
| 4,124,461 A | 11/1978 | Stauter |
| 4,135,997 A | 1/1979 | Stauter |
| 4,151,053 A | 4/1979 | Seko et al. |
| 4,162,187 A | 7/1979 | Smith et al. |
| 4,209,367 A | 6/1980 | Seko et al. |
| 4,266,036 A | 5/1981 | Baczek et al. |
| 4,363,707 A | 12/1982 | Prigent et al. |
| 4,414,338 A | 11/1983 | Kimoto et al. |
| 4,526,774 A * | 7/1985 | Maas et al. .......... 423/576.2 |
| 4,544,461 A | 10/1985 | Venkatesan et al. |
| 4,765,873 A | 8/1988 | Chang et al. |
| 4,765,969 A | 8/1988 | Chang et al. |
| 4,772,366 A | 9/1988 | Winnick |
| 4,874,589 A | 10/1989 | Gorlich |
| 4,920,015 A | 4/1990 | Sammells |
| 5,019,227 A | 5/1991 | White et al. |

(Continued)

FOREIGN PATENT DOCUMENTS

EP 0 811 416 A2 12/1997

(Continued)

*Primary Examiner*—Timothy C Vanoy
(74) *Attorney, Agent, or Firm*—Bronwyn A. Welvaert

(57) ABSTRACT

The present invention includes a process for the removal of hydrogen sulfide from hydrogen sulfide gas containing gaseous streams. In one embodiment, the process comprises feeding a sulfide ion containing solution to an oxidation unit. The method further comprises feeding an oxidizing gas to the oxidation unit and contacting the sulfide ion containing solution with the oxidizing gas under sufficient conditions to form a polysulfide solution comprising polysulfide and hydroxide ions. In addition, the process comprises mixing the polysulfide containing solution with a hydrogen sulfide gas under conditions sufficient for absorption of hydrogen sulfide and precipitation of sulfur from the polysulfide containing solution. In some embodiments, the process comprises separating the precipitated sulfur from liquid.

40 Claims, 6 Drawing Sheets

U.S. PATENT DOCUMENTS

| | | |
|---|---|---|
| 5,405,509 A | 4/1995 | Lomasney et al. |
| 5,489,370 A | 2/1996 | Lomasney et al. |
| 5,578,189 A | 11/1996 | Joshi |
| 5,695,632 A | 12/1997 | Brons et al. |
| 5,908,545 A | 6/1999 | Donini et al. |
| 5,935,421 A | 8/1999 | Brons et al. |
| 5,935,547 A | 8/1999 | LeComte et al. |
| 5,972,197 A | 10/1999 | Andoh et al. |
| 6,017,501 A | 1/2000 | Waycuilis |
| 6,217,839 B1 | 4/2001 | Hess et al. |
| 6,241,871 B1 | 6/2001 | Donini et al. |
| 6,264,819 B1 | 7/2001 | Andoh et al. |
| 6,306,288 B1 | 10/2001 | Pittman et al. |
| 6,517,699 B2 | 2/2003 | Shimohira et al. |
| 6,627,110 B1 | 9/2003 | Smith et al. |
| 2001/0005981 A1 | 7/2001 | Winchester et al. |
| 2002/0004182 A1 | 1/2002 | McReynolds |
| 2002/0021993 A1 | 2/2002 | Watson et al. |
| 2002/0134706 A1 | 9/2002 | Keller et al. |
| 2003/0021744 A1 | 1/2003 | DeBerry et al. |
| 2003/0103884 A1 | 6/2003 | Lynn |

FOREIGN PATENT DOCUMENTS

| | | |
|---|---|---|
| WO | WO 01/42396 A1 | 6/2001 |
| WO | WO 01/56683 A1 | 8/2001 |

* cited by examiner

ELECTROCHEMICAL PROCESS FOR DECOMPOSITION OF HYDROGEN SULFIDE AND PRODUCTION OF SULFUR

CROSS-REFERENCE TO RELATED APPLICATIONS

Not applicable.

STATEMENT REGARDING FERDERALLY SPONSORED RESEARCH OR DEVELOPMENT

Not applicable.

BACKGROUND OF THE INVENTION

1. Field of the Invention

This invention relates to the field of gas conversion and more specifically to the field of converting hydrogen sulfide to recover sulfur.

2. Background of the Invention

Processes for removing hydrogen sulfide from affluent gaseous and liquid streams and converting hydrogen sulfide into elemental sulfur have been widely used. For instance, chemical and electrochemical processes have been used to recover sulfur. One example of a chemical process is the Claus process, which is typically used for large-scale production of sulfur from hydrogen sulfide gas in a two-step method. Drawbacks of the Claus process include the tail gas containing a significant amount of hydrogen sulfide and sulfur dioxide gases. Moreover, the process typically has to be built on a large scale to be economically feasible. Another chemical process is thermal decomposition, which involves directly decomposing hydrogen sulfide gas into sulfur and hydrogen gas at an elevated temperature. Problems with the thermal decomposition process include inefficiencies typically involved in separating between sulfur and hydrogen gas at high temperatures. An additional chemical process includes oxidizing the hydrogen sulfide into sulfur using chemical oxidizers such as transition metal oxides and iodine. Problems involve the consumption of oxidizers that can result in the sulfur containing a metal oxidizer, which may reduce its economic value.

Electrochemical processes include electrolysis in aqueous solutions and high temperature processes. In processes involving electrolysis in aqueous solutions, a cation-conductive membrane is typically used to prevent polysulfide ions from reaching a cathode and thereby being reduced back to sulfide ions. Drawbacks include the economic costs of the membrane as well as a high consumption of energy with the process. Processes involving high temperatures involve high temperature fuel cells that have a membrane typically comprising oxygen-conductive or proton-conductive oxide material. Problems with such high temperature processes include the resulting gases from the oxygen-conductive membrane containing sulfur dioxide, and the lack of stability in the membrane and electrode with proton-conductive membranes.

Consequently, there is a need for an economical process for removing sulfur from toxic gases such as hydrogen sulfide. Additional needs include an improved process for recovering sulfur in which the resulting gas is relatively clean of sulfur dioxide.

BRIEF SUMMARY OF SOME OF THE PREFERRED EMBODIMENTS

These and other needs in the art are addressed in one embodiment by a process for the removal of hydrogen sulfide from a hydrogen sulfide containing stream. The process comprises feeding a sulfide ion containing solution to an oxidation unit. The process further comprises feeding an oxidizing gas to the oxidation unit. The process also includes contacting the sulfide ion containing solution with the oxidizing gas under sufficient conditions to form a polysulfide solution comprising polysulfide and hydroxide ions. In addition, the process comprises mixing the polysulfide solution with a hydrogen sulfide containing gas under conditions sufficient for absorption of hydrogen sulfide and precipitation of sulfur from the polysulfide containing solution.

In another embodiment, these and other needs in the art are addressed by a process for removing hydrogen sulfide from a hydrogen sulfide containing stream comprising feeding a sulfide ion containing solution to an electrochemical cell comprising a cathode. The process further comprises feeding an oxidizing gas to the electrochemical cell under sufficient conditions to form a polysulfide solution comprising polysulfide ions and hydroxide ions. In addition, the process comprises transferring the polysulfide solution to a scrubber. Moreover, the process comprises mixing the polysulfide solution in the scrubber with a hydrogen sulfide containing gas under conditions sufficient for absorption of hydrogen sulfide and precipitation of sulfur from the polysulfide solution.

In an additional embodiment, these and other needs in the art are addressed by a process for the recovery of sulfur from hydrogen sulfide comprising feeding a sulfide ion containing solution to an oxidation unit comprising a catalytic bed. The process further comprises feeding an oxidizing gas to the oxidation unit, and contacting the oxidizing gas with the sulfide ion containing solution in the oxidation unit under sufficient conditions to form polysulfide and hydroxide ions. In addition, the process comprises transferring a polysulfide solution containing polysulfide and hydroxide ions to a scrubber. Moreover, the process comprises mixing the polysulfide solution in the scrubber with a hydrogen sulfide containing gas under conditions sufficient for absorption of hydrogen sulfide and precipitation of sulfur from the polysulfide solution, and removing a liquid solution containing the precipitated sulfur from the scrubber and feeding the liquid solution to a separator, wherein the sulfur is separated from the liquid solution. The process further comprises feeding the liquid solution to the oxidation unit.

The process of removing hydrogen sulfide of the aforementioned embodiments overcomes problems in the art such as the resulting gases containing significant amounts of sulfur dioxide and hydrogen sulfide. For instance, the process produces a clean gas. Moreover, the process provides a cost efficient method for sulfur recovery.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
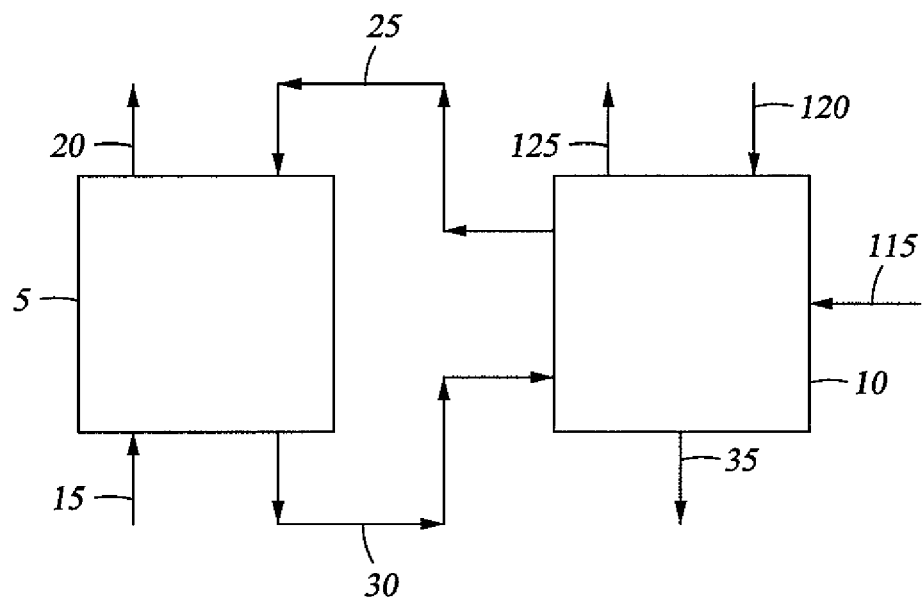
FIG. 1 illustrates a process for the removal of hydrogen sulfide from a hydrogen sulfide containing stream comprising an oxidation unit and a sulfur recovery unit.
Figure 2:
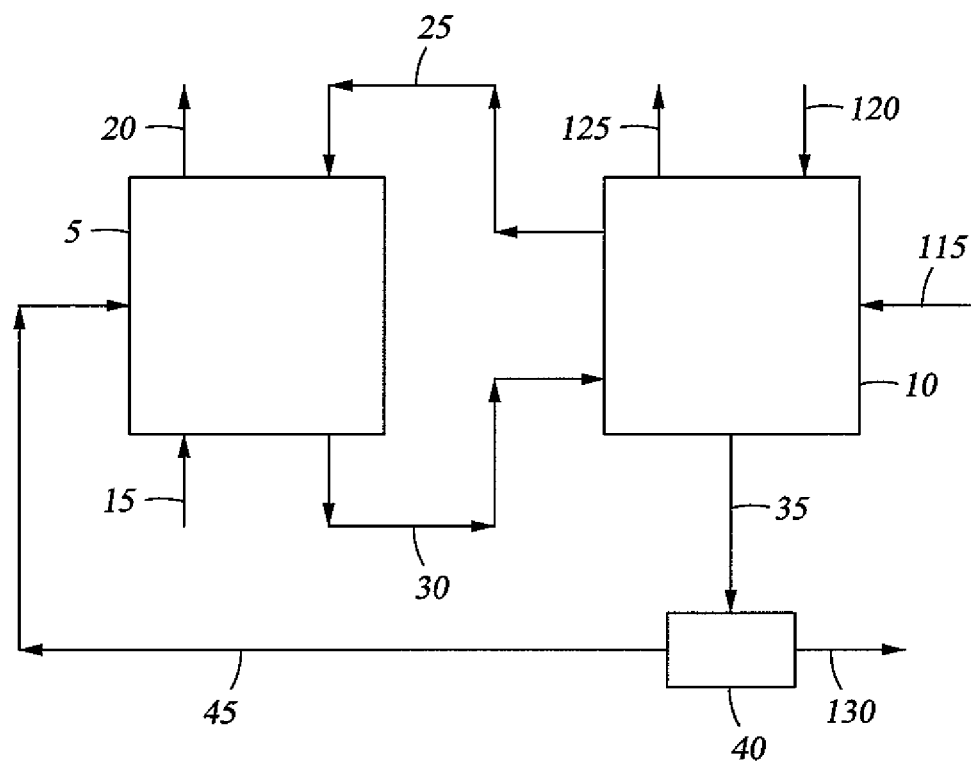
FIG. 2 illustrates a process for the removal of hydrogen sulfide from a hydrogen sulfide containing stream comprising an oxidation unit, a sulfur recovery unit, and a separator.

FIG. 1 illustrates a process for removing hydrogen sulfide from a hydrogen sulfide containing gas stream, wherein the process comprises an oxidation unit 5 and a sulfur recovery unit 10. Oxidation unit 5 comprises an electrochemical cell that is suitable for electrolysis of a solution containing sulfide ions, thereby resulting in the production of polysulfide ions and regeneration of caustic. The solution is provided by electrolyte feed 25 fed from sulfur recovery unit 10. A solution containing polysulfide and hydroxide ions is fed to sulfur recovery unit 10 in polysulfide feed 30 upon which the solution is mixed with hydrogen sulfide gas, and sulfur is precipitated. In an embodiment, sulfur is precipitated simultaneous to mixing of the solution with the hydrogen sulfide gas. FIG. 2 illustrates an embodiment wherein the precipitated sulfur is fed by precipitated sulfur stream 35 to a separator 40 in which the elemental sulfur is separated from liquid in precipitated sulfur stream 35. The liquid may then be fed back to oxidation unit 5 by recycle stream 45. Separator 40 may include any separator suitable for separating a solid from a liquid. Without limitation, examples of suitable separators include solid-liquid filters, vacuum filter belts, compress filters, centrifugal filters, and sulfur pits.

Figure 3:
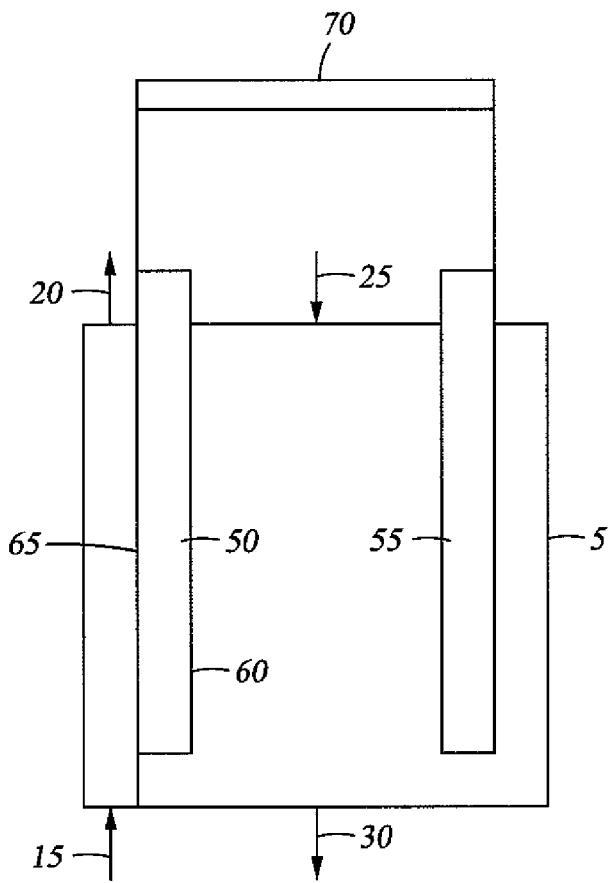
FIG. 3 illustrates an oxidation unit comprising an anode, a cathode, and a load controller.

The electrochemical cell of oxidation unit 5 can be any type of electrochemical cell suitable for electrolysis of a solution containing sulfide ions. For instance, the electrochemical cell has one compartment in which the solution and electrodes are disposed. FIG. 3 illustrates an embodiment wherein oxidation unit 5 has one compartment containing a cathode 50 and an anode 55. The electrochemical cell can contain one cathode 50 or more than one cathode 50. Cathode 50 may be fabricated by any suitable method. As illustrated in the embodiment of FIG. 3, cathode 50 has a reaction side 60 and a gas diffusion side 65, with the reaction side 60 exposed to at least a portion of the interior of the electrochemical cell and at least a portion of gas diffusion side 65 exposed to oxidizing gas feed 15. Cathode 50 comprises an electrode substrate. On the reaction side 60, the electrode substrate has a catalytic material on its surface. On the gas diffusion side 65, the electrode substrate has a hydrophobic material on its surface. In alternative embodiments, gas diffusion side 65 does not have hydrophobic material on it surface. The electrode substrate can be any electrically conductive material that is stable in an alkaline sulfide solution. The electrode substrate is gas permeable and comprises carbon; graphite; metal; metal alloys such as cobalt and nickel, and their alloys; metal oxides such as nickel oxide and iron oxide; metal sulfides such as cobalt sulfide, titanium sulfide, and molybdenum sulfide; metal nitrides such as titanium nitride and boron nitride; an electronically conductive polymer; or combinations thereof. In an alternative embodiment, the electrode substrate comprises graphite. The catalytic material may be a precious metal, transition metal, transition metal oxide, transition metal sulfide, lead, bismuth, antimony, or combinations thereof. Without limitation, examples of transition metals include nickel, cobalt, titanium, molybdenum, platinum, gold, silver, or combinations thereof. Examples of suitable transition metal oxides include without limitation CoO, NiO, $TiO_2$, or combinations thereof. Examples of suitable transition metal sulfides include without limitation CoS, $TiS_2$, $MoS_2$, FeS, CuS, or combinations thereof. The catalytic material can be formed on the substrate by any suitable method. For instance, the catalytic material can be coated on the substrate before use in the process or coated in-situ. Without limitation, an example of a suitable hydrophobic material is a hydrophobic polymer. Examples of suitable hydrophobic polymers include without limitation polytetrafluoroethylene, waxes, or combinations thereof. A commercial example of a suitable polytetrafluoroethylene is TEFLON, which is available from Dupont. In an embodiment, cathode 50 includes a gas diffusion electrode that is suitable for fuel cells. For instance, cathode 50 may be a gas diffusion plate such as a sintered porous plate (e.g., a sintered porous metal plate or sintered porous carbon plate). In an embodiment, cathode 50 is a sintered porous carbon (e.g., graphite) plate. In alternative embodiments, the electrode substrate may have non-catalytic material on its reaction side 60. Without limitation, examples of suitable non-catalytic materials include inactive carbon black and electronically conductive polymer.

Figure 4:
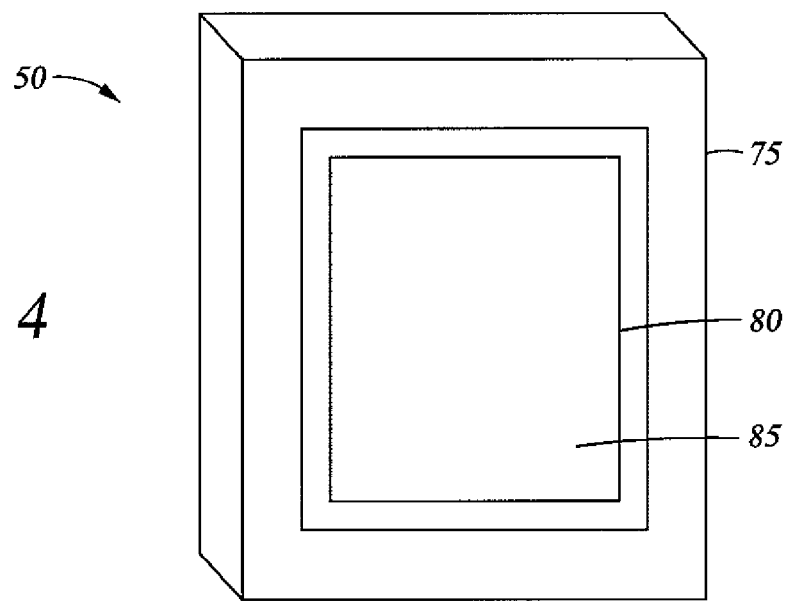
FIG. 4 illustrates a cathode comprising a gas diffusion plate.

FIG. 4 illustrates a side view of an embodiment of cathode 50 in which cathode 50 is a gas diffusion plate comprising a porous plate 75 (e.g., graphite plate). Porous plate 75 comprises a gas diffusion membrane 80 and a chamber 85. Chamber 85 refers to the area enclosed within porous plate 75 and gas diffusion membrane 80. Gas diffusion membrane 80 can comprise any material that is suitable for allowing gas to diffuse therethrough. For instance, gas diffusion membrane 80 can be a gas diffusion cloth, film, membrane, and the like. In this embodiment, porous plate 75 has gas diffusion membrane 80 that sufficiently cover any openings in porous plate 75 so that a gas flowing through chamber 85 may diffuse through gas diffusion membrane 80. It is to be understood that porous plate 75 has a gas diffusion membrane 80 on the side as illustrated and also on the opposite side of cathode 50 (not illustrated). The gas can diffuse through gas diffusion membrane 80, but the liquid in the electrochemical cell does not diffuse through gas diffusion membrane 80. For instance, the oxidizing gas pressure is regulated to have a sufficient pressure difference (e.g., a higher pressure in chamber 85 than in the electrochemical cell) between chamber 85 and the liquid in the electrolytic cell so that the liquid does not penetrate through gas diffusion membrane 80, but the oxidizing gas diffuses to the liquid in the electrolytic cell. In some embodiments, gas diffusion side 65 is coated with a hydrophobic material. In an embodiment, oxidizing gas is supplied by oxidizing gas feed 15 and fed to gas diffusion side 65 of cathode 50. The oxidizing gas diffuses through gas diffusion side 65 and circulates through chamber 85 with a portion of the gas diffusing through gas diffusion membrane 80 on the reaction side 60 to the liquid electrolyte in the electrochemical cell.

The electrochemical cell can contain one cathode 50 or more than one cathode 50. In alternative embodiments, cathode 50 can be formed with a plurality of gas diffusion plates and a plurality of gas and liquid channels. In such alternative embodiments, the gas channel is on one side of a gas diffusion plate (e.g., porous plate 75) and a liquid channel is on the other side of the gas diffusion plate. The pressure in the gas channel is sufficiently higher than the pressure in the liquid channel so that liquid cannot migrate to the gas channel, but gas can migrate to the liquid channel from the gas channel. The liquid channel can be located between two gas diffusion plates or between a gas diffusion plate and a solid plate. The solid plate can comprise any electrically conductive material including carbon, metal, and metal alloys. The solid plate can be used as the electrode where oxidation of sulfide ions to polysulfide ions take place. In addition, the solid plate may also be directly connected with the gas diffusion electrode to increase the surface area for oxidation of sulfide ions. In some embodiments, the liquid channel comprises at least one spacer, which serves as mechanical support for a plate. The spacers comprise any material that is substantially stable in a caustic sulfide solution. It is to be understood that substantially stable refers to a material that does not easily decay under the process conditions herein described. In some embodiments, the spacer comprises an electrically conductive material such as without limitation carbon, metal, and metal alloys. In alternative embodiments, the spacer is formed as part of the gas diffusion plate and/or the solid plate. The gas and liquid channels can be in any applicable shapes such as without limitation rectangle, square, diamond, round, and the like.

Figure 5A:
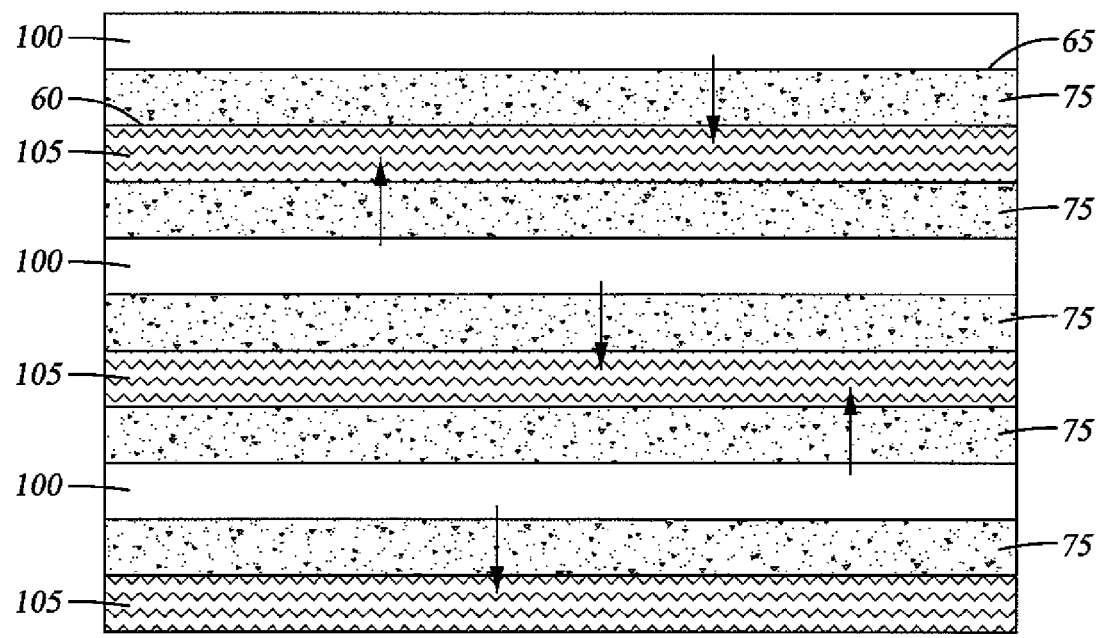
FIG. 5*a* illustrates a cross sectional view of a portion of an oxidation unit comprising a plurality of gas and liquid channels having rectangular shapes.

FIG. 5a illustrates a cross sectional view of a cathode 50 having multiple gas channels 100 and liquid channels 105 in which the channels comprise rectangular shapes. In the embodiment illustrated in FIG. 5a, gas diffusion plates 75 with rectangular shapes separate the gas channels 100 and the liquid channels 105. Gas channels 100 are at higher pressures than liquid channels 105 and therefore at least a portion of the gas in gas channels 100 migrate through gas diffusion plates 75 to liquid channels 105 as shown by the representative arrows. The arrows are illustrative only and not limiting as to the migratory flow of the gas. In this embodiment, gas diffusion side 65 is on the side of gas channel 100, and reaction side 60 is on the side of liquid channel 105.

Figure 5B:
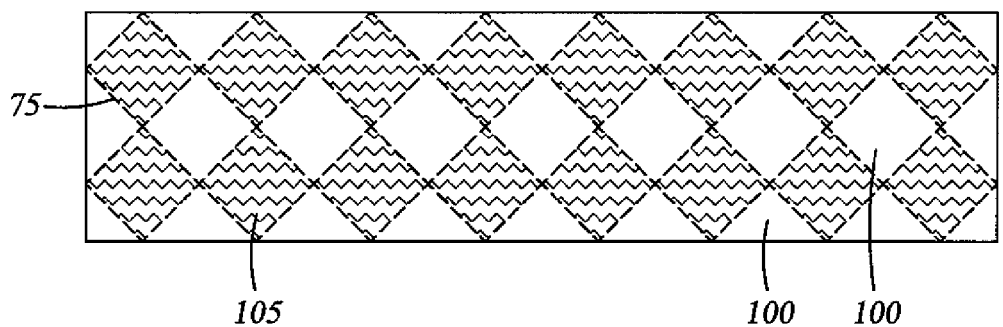
FIG. 5*b* illustrates a cross sectional view of a portion of an oxidation unit comprising a plurality of gas and liquid channels having diamond shapes.

FIG. 5b illustrates a cross sectional view of a cathode 50 having multiple gas channels 100 and liquid channels 105 in which the channels comprise diamond shapes. Gas diffusion plates 75 with diamond shapes separate gas channels 100 and liquid channels 105. The gas channels 100 are at higher pressures than the liquid channels 105, and therefore at least a portion of the gas in gas channels 100 migrate through gas diffusion plates 75 to liquid channels 105 as shown by the representative arrows. The arrows are illustrative only and not limiting as to the migratory flow of the gas.

It is to be understood that FIGS. 5a and 5b are representative examples of a cathode 50, and cathode 50 is not limited to the number of channels 100, 105 and gas diffusion plates 75 as illustrated but instead can have any number of channels 100, 105 and gas diffusion plates 75. For instance, in some embodiments, cathode 50 has one gas channel 100, one liquid channel 105, and one gas diffusion plate 75. In embodiments having a plurality of channels 100, 105 and gas diffusion plates 75 as illustrated in FIGS. 5a and 5b, channels 100, 105 and gas diffusion plates 75 are stacked alternatively, for instance as illustrated in FIGS. 5a and 5b.

Referring to FIG. 3, anode 55 may be fabricated by any suitable method. In one embodiment, anode 55 comprises an electrode substrate with a catalytic material on the surface of the electrode substrate. The electrode substrate can comprise carbon, metal, metal alloys, or combinations thereof. An example of a suitable carbon includes without limitation graphite. The catalytic material may be functional carbon, precious metal, a transition metal, transition metal oxide, transition metal sulfide, lead, bismuth, antimony, or combinations thereof. Without limitation, examples of functional carbon include various activated carbon black and oxidized carbon powder. Without limitation, examples of transition metals include nickel, cobalt, titanium, molybdenum, platinum, gold, silver, or combinations thereof. Examples of suitable transition metal oxides include without limitation $CoO$, $NiO$, $TiO_2$, or combinations thereof Examples of suitable transition metal sulfides include without limitation $CoS$, $TiS_2$, $MoS_2$, $FeS$, $CuS$, or combinations thereof. The catalytic material can be formed on the substrate by any suitable means. For instance, the catalytic material can be coated on the substrate before use in the process or coated in-situ. In an embodiment, anode 55 is a transition metal sulfide coated carbon plate. It is to be understood that the electrochemical cell is not limited to containing one anode 55 but instead can contain more than one anode 55. In alternative embodiments, the electrode substrate does not have a catalytic material on its surface.

In the embodiment illustrated in FIG. 3, electricity may be produced, captured, and/or consumed by a load controller 70. Load controller 70 is connected to both cathode 50 and anode 55. Load controller 70 can include any suitable device for controlling either the voltage across the anode and the cathode or the current through the electrochemical cell. In an alternative embodiment (not illustrated), electricity is produced by the electrochemical cell and captured by an external circuit. An external circuit involves functions such as electrical power transformation, distribution of electrical power, conversion of direct current to alternative current, and the like.

Figure 6:
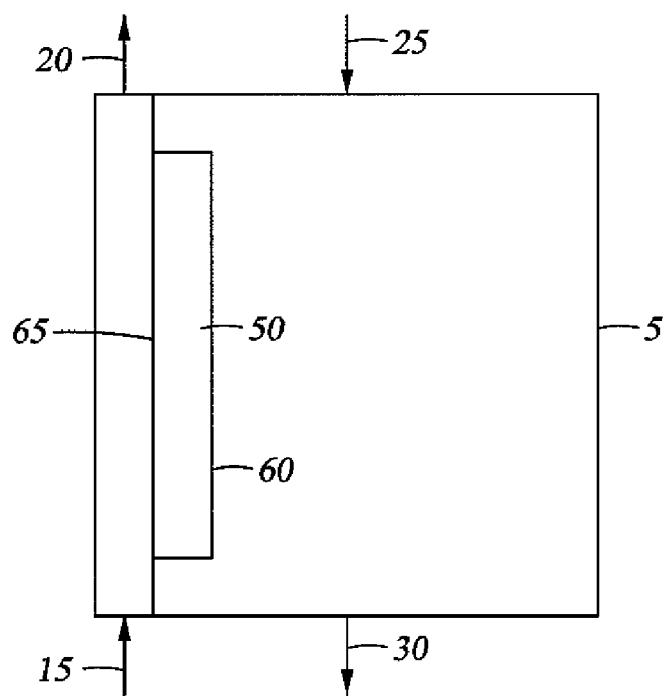
FIG. 6 illustrates an oxidation unit comprising a gas diffusion plate.

FIG. 6 illustrates another embodiment of oxidation unit 5. In this embodiment, oxidation unit 5 has cathode 50 but no anode 55. It is to be understood that this embodiment contains all of the above-described embodiments for cathode 50.

As illustrated in FIGS. 1 and 2, sulfur recovery unit 10 can be any column suitable for scrubbing hydrogen sulfide from a hydrogen sulfide gas containing stream. The column can be of any conventional design such as a bubble column but is designed to provide sufficient contacts between polysulfide feed 30 and hydrogen sulfide feed 120.

The following describes an application of the present invention as described in FIGS. 1 and 3. A caustic solution is fed by caustic feed 115 to sulfur recovery unit 10. In an embodiment, the caustic solution is a fresh caustic solution. It is to be understood that the caustic solution may be used for process start-up or caustic make-up. The caustic solution comprises alkaline metal ions, earth metal ions, inorganic compound cations, organic compound cations, amine groups, salts, or combinations thereof. Without limitation, examples of suitable alkaline earth metal ions include lithium ions, sodium ions, potassium ions, and the like. Suitable earth metal ions include without limitation magnesium ions and the like. In addition, examples of suitable inorganic compound cations include without limitation ammonium ions. Without limitation, an example of a suitable organic compound cation includes an amine group. Moreover, examples of salts include without limitation alkaline metal salts such as sodium and potassium chloride, sulfate, and perchlorate. The caustic solution also comprises a carrier fluid such as water or a water and organic mixture. Caustic solution may be fed to sulfur recovery unit 10 in molar ratios of caustic to hydrogen sulfide from about 0:1 to about 10:1, alternatively from about 0.1:1 to about 5:1.

As further illustrated in FIGS. 1 and 3, hydrogen sulfide is introduced to sulfur recovery unit 10 by hydrogen sulfide feed 120. In some embodiments, hydrogen sulfide is fed to sulfur recovery unit 10 in a hydrogen sulfide containing fluid such as natural gas containing hydrogen sulfide. At least a portion of the hydrogen sulfide gas and the caustic solution are mixed and form the feed to oxidation unit 5, which is electrolyte feed 25 and is the electrolyte in the electrochemical cell of oxidation unit 5. An oxidizing gas is fed by oxidation gas feed 15 to oxidation unit 5. Examples of suitable oxidizing gases include without limitation oxygen gas, air, sulfur oxide gases, nitrogen oxides, or combinations thereof. Examples of suitable sulfur oxide gases include without limitation sulfur dioxide and sulfur trioxide. The oxidizing gas is fed to oxidation unit 5 and thereby to cathode 50. The oxidizing gas is fed to cathode 50 at a pressure of from about 0.01 atm to about 50 atm, alternatively from about 0.1 to about 5 atm. In an embodiment, cathode 50 comprises a gas diffusion plate such as porous plate 75 illustrated in FIG. 4. The oxidizing gas enters gas chamber 85 and diffuses through gas diffusion side 65 to reaction side 60 at which at least a portion of the oxidizing gas is reduced to form hydroxide ions. The reduced oxidizing gas diffuses through cathode 50 and into the electrolyte solution of the electrochemical cell. In an embodiment wherein oxygen is the oxidizing gas, the reduction reaction at cathode 50 may be represented by the following formula.

$$x/2O_2 + xH_2O + 2xe^- \rightarrow 2xOH^- \quad (1)$$

wherein x represents molar units, and e⁻ represents electrons that are involved in the reaction. In embodiments wherein the oxidizing gas includes sulfur dioxide and sulfur trioxide gases, at least a portion of the sulfur oxide gases are reduced at cathode 50. The following formulas represent the reduction reactions of sulfur dioxide and sulfur trioxide gases, respectively, at cathode 50.

$$xSO_2 + S^{2-} + 2xH_2O + 4xe^- \rightarrow S^{2-}_{1+x} + 4xOH^- \quad (2)$$

$$xSO_3 + S^{2-} + 3xH_2O + 6xe^- \rightarrow S^{2-}_{1+x} + 6xOH^- \quad (3)$$

In the electrochemical cell, polysulfide ions are formed at anode 55 as sulfide ions in the electrolyte solution are oxidized at anode 55. The oxidation reaction at anode 55 to form the polysulfide ions may be represented by the following formula.

$$(1+x)S^{2-} - 2xe^- \rightarrow S^{2-}_{1+x} \quad (4)$$

wherein x represents molar units, and e⁻ represents release electrons. Without being limited by theory, the average chain length of polysulfide ions may be dependent on the reaction time, reaction rate, and/or the total charge passed through the electrochemical cell. As oxidation unit 5 has one compartment containing both cathode 50 and anode 55, it is to be understood that polysulfide ions may be formed at cathode 50 in addition to the reactions at anode 55.

The net oxidation reaction in the electrochemical cell at both cathode 50 and anode 55 is represented by the following formula.

$$(1+x)S^{2-} + (x/2)O_2 + xH_2O \rightarrow S^{2-}_{1+x} + 2xOH^- \quad (5)$$

The operating conditions in oxidation unit 5 are controlled to obtain the desired oxidation reactions. In an embodiment, the temperature of the electrolyte solution in the electrochemical cell is between about 0° C. and about 200° C., alternatively between about 30° C. and about 150° C., and alternatively between about 40° C. and about 85° C. The temperature of the electrolyte solution may be controlled by heat exchanger, and any other suitable methods. The electrolyte concentration in the cell may be between about 0.1 M and about 10 M, alternatively between about 0.5 M and about 8 M, and alternatively between about 1 M and about 6 M. It is to be understood that M represents moles/liter. In addition, the pH value of electrolyte feed 25 is maintained above about 7, alternatively above about 8. The pH of electrolyte feed 25 may be controlled by regulating fresh caustic feed 115. The pH value of the resulting polysulfide containing solution fed to sulfur recovery unit 10 in polysulfide feed 30 is about 8 or higher, alternatively about 10 or higher. To control the pH of the resulting polysulfide containing solution, the pH of the electrolyte solution in the electrochemical cell is controlled by adjusting the pH of electrolyte feed 25, regulating fresh caustic feed 115, resident time in oxidation unit 5, and flow rate of oxidizing gas 115. In some embodiments, the hydroxide ion concentration in the electrochemical cell is controlled. The hydroxide concentration may be controlled by adjusting the pressure of the oxidizing gas, hydrogen sulfide feed 120, and reaction time in oxidation unit 5. In an embodiment, the hydroxide ion concentration is maintained between about 0.01 mole/liter and about 7 moles/liter, alternatively between about 0.1 moles/liter and about 4 moles/liter, and alternatively between about 0.5 moles/liter and about 1.5 moles/liter.

As further illustrated in FIGS. 1 and 3, the current density and/or the oxidizing gas pressure are controlled to maintain an electrode potential at cathode 50 that is sufficiently higher than the reduction potential of polysulfide ions at which polysulfide ions may be reduced back to sulfide ions and also that is sufficiently lower than the oxidation potential of sulfide or polysulfide ions at which sulfide or polysulfide ions may be oxidized into sulfur oxyanions such as thionsulfite and thionsulfate. It is to be understood that polysulfide ions are typically reduced back to sulfide ions at a potential of at least 0.1 volts more negative than anode 55. The electrode potential at cathode 50 is also sufficiently maintained so that polysulfide ions are not oxidized into sulfur oxyanions. It is to be understood that polysulfide ions are oxidized into sulfur oxyanions at a potential 0.8 volts more positive than anode 55. Therefore, in an embodiment, the current density is maintained so that the cell voltage is in the range of between about −0.5 and about 0.9 volts, alternatively between about −0.1 and about 0.8 volts. Cell voltage refers to the potential at cathode 50 relative to anode 55.

Further referring to the illustrations of FIGS. 1 and 3, the electrolyte solution containing the polysulfide and hydroxide ions is transferred to sulfur recovery unit 10 by polysulfide feed 30. In sulfur recovery unit 10, polysulfide feed 30 is mixed with hydrogen sulfide gas introduced by hydrogen sulfide feed 120. Polysulfide feed 30 and hydrogen sulfide feed 120 may be fed at any location to sulfur recovery unit 10. In an embodiment, polysulfide feed 30 is fed at the top of sulfur recovery unit 10, and hydrogen sulfide feed 120 is fed at the bottom of sulfur recovery unit 10. By mixing the two feeds, hydrogen sulfide reacts with hydroxide ions in the polysulfide solution to form water. By forming water, the pH value of the electrolyte solution is reduced. In an embodiment, the pH value is reduced to a value of above about 7, alternatively above about 8. In addition, elemental sulfur is precipitated from the electrolyte solution. Without being limited by theory, it is believed that reducing the pH value may cause precipitation of the sulfur. The reaction of the hydrogen sulfide gas with the hydroxide ions is represented by the following formula.

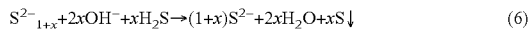

$$S^{2-}_{1+x} + 2xOH^- + xH_2S \rightarrow (1+x)S^{2-} + 2xH_2O + xS\downarrow \qquad (6)$$

wherein S↓ represents precipitated elemental sulfur. The precipitated sulfur is removed from sulfur recovery unit 10 by precipitated sulfur stream 35. Along with the precipitated sulfur, precipitated sulfur stream 35 further may comprise other components such as without limitation water, sulfide, polysulfide, sulfite, thiosulfite, and sulfate. The electrolyte solution containing unreacted and newly added sulfide ions is then circulated to oxidation unit 5 by electrolyte feed 25. Product gas may also be produced in sulfur recovery unit 10 and removed in product gas stream 125. The product gas is substantially free of hydrogen sulfide gas. Substantially free of sulfur refers to the gas containing less than about 100 parts per million hydrogen sulfide, alternatively less than about 20 ppm hydrogen sulfide.

In some embodiments, the application described above and illustrated in FIGS. 1 and 3 further includes separating elemental sulfur from liquid in precipitated sulfur stream 35 as illustrated in FIG. 2. In such embodiments, precipitated sulfur stream 35 is fed to separator 40. Separator 40 is operated under conditions sufficient for separating the elemental sulfur from the liquid in precipitated sulfur stream 40. The elemental sulfur is removed from separator 40 as sulfur product 130. The separated liquid containing water and sulfide salts is recycled to oxidation unit 5 in recycle stream 45.

In some embodiments, oxidation unit 5 comprises at least one cathode 50 but no anode 55. The following describes an application of such embodiments as described in FIGS. 1 and 6, which comprises substantially all of the elements of the above-discussed embodiments as illustrated in FIGS. 1 and 3 and alternative embodiments thereof, but without oxidation unit 5 containing an anode 55. Hydrogen sulfide feed 120 is fed to sulfur recovery unit 10 and at least a portion of the hydrogen sulfide is absorbed by the caustic solution in sulfur recovery unit 10. The solution containing absorbed sulfide ions is fed to oxidation unit 5 as electrolyte feed 25. Oxidizing gas is fed by oxidation gas feed 15 to oxidation unit 5 and thereby to cathode 50. In these embodiments, cathode 50 comprises a plurality of gas diffusion plates and a plurality of gas and liquid channels, for instance as illustrated in FIGS. 5a and 5b. In operation, oxidizing gas is fed from oxidizing gas feed 15 to gas channels 100, and electrolyte solution is fed from electrolyte feed 25 to liquid channels 105. The gas is fed at a pressure sufficiently higher than that in liquid channel 105, and at least a portion of the oxidizing gas enters gas diffusion side 65 and diffuses through porous plate 75 to reaction side 60 and liquid channel 105. At reaction side 60 and upon mixing with the electrolyte solution, the reduction reaction of formula (1) occurs on reaction side 60 of gas diffusion plate 75, and hydroxide ions are formed. In embodiments wherein the oxidizing gas comprises sulfur dioxide and sulfur trioxide gases, the reactions of formulas (2) and (3) also occur on reaction side 60, and hydroxide and polysulfide ions are formed. In addition, the oxidation reaction of formula (4) may also occur in the liquid channel 105 at reaction side 60 of gas diffusion plate 75, whereby sulfide ions are converted to polysulfide ions. Without being limited by theory, it is believed that because porous plate 75 and catalyst particles on reaction side 60 are electrically conductive that the reactions forming hydroxide and polysulfide ions occur at different sites, respectively, on reaction side 60. The net oxidation reaction in the electrochemical cell at cathode 50 is represented by formula (5). The operating conditions in oxidation unit 5 are controlled to obtain the desired oxidation and reduction reactions according to the embodiments and conditions noted above. The electrolyte solution containing the polysulfide and hydroxide ions is then transferred to sulfur recovery unit 10 by polysulfide feed 30 and mixed with the hydrogen sulfide gas. Water is thereby formed by the reaction of hydroxide ions with hydrogen sulfide, and the pH value of the electrolyte solution is reduced, which results in the precipitation of elemental sulfur. Formula (6) represents such a reaction. The electrolyte solution containing unreacted sulfide ions is then re-circulated to the oxidation unit 5 by electrolyte feed 25. Product gas may also be produced in sulfur recovery unit 10 and removed in product gas stream 125. The precipitated sulfur and residual solution are removed from sulfur recovery unit 10 by precipitated sulfur stream 35. In alternative embodiments as illustrated in FIG. 2, precipitated sulfur stream 35 may be fed to a separator 40 in which elemental sulfur is separated from the liquid. In such an alternative embodiment, the separated liquid is recycled to oxidation unit 5 in recycle stream 45.

Figure 7:
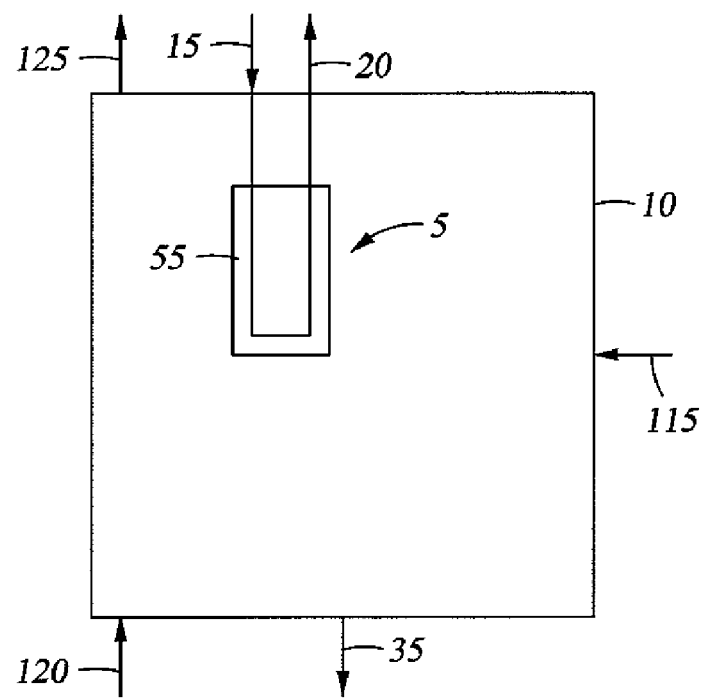
FIG. 7 illustrates a process for the recovery of sulfur comprising an oxidation unit disposed within a sulfur recovery unit.
Figure 8:
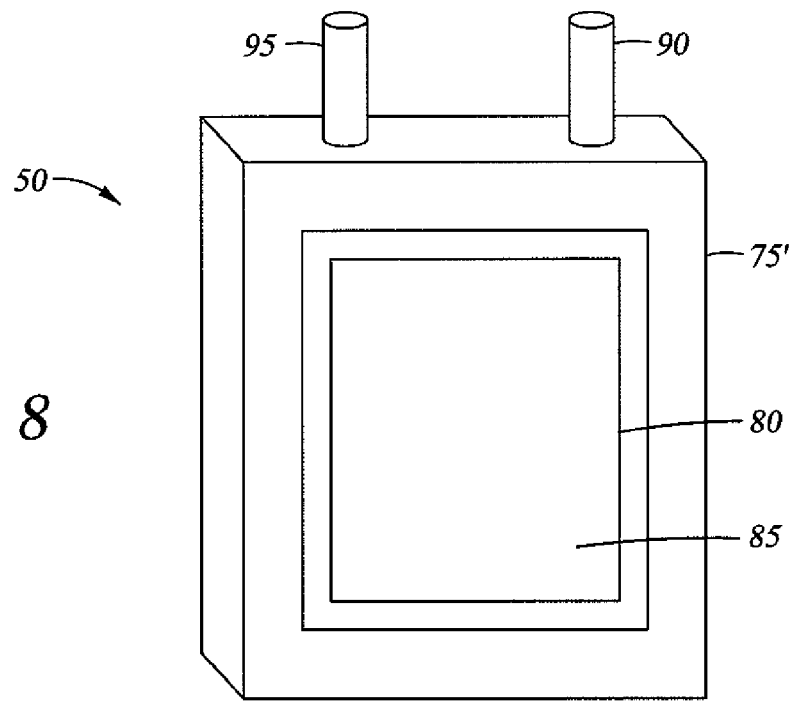
FIG. 8 illustrates a cathode comprising a gas diffusion plate having a gas inlet and outlet.

FIG. 7 illustrates an alternative embodiment of the process for the removal of sulfur wherein oxidation unit 5 is integrated with sulfur recovery unit 10. In this embodiment, oxidation unit 5 is located within sulfur recovery unit 10. Oxidation unit 5 includes one or more cathodes 50 but no anode 55. In this alternative embodiment, cathode 50 preferably comprises one or more gas diffusion plates having a plurality of gas and liquid channels, for instance as illustrated in FIGS. 5a and 5b. In this embodiment, cathode 50 may comprise the porous plate 75' illustrated in FIG. 8. It is to be understood that porous plate 75' illustrated in FIG. 8 is similar to porous plate 75 illustrated in FIG. 4 with the additional feature of gas inlet 90 and gas outlet 95. Therefore, instead of being fed to one side of the plate and diffusing through the plate, the oxidizing gas is fed directly to chamber 85 by gas inlet 90 and may diffuse into the liquid electrolyte through one or both sides of porous plate 75'. Any gas that does not diffuse through the plate may exit porous plate 75' by gas outlet 95.

The following describes an application of the present invention as described in FIGS. 7 and 8. Caustic feed 115 and hydrogen sulfide feed 120 are fed to sulfur recovery unit 10 and form an electrolyte solution. Oxidizing gas feed 15 is fed to oxidation unit 5 and enters gas diffusion plate 75' by gas inlet 90. The gas flows into chamber 85 and at least a portion diffuses through the plate 75' and into the electrolyte solution comprising the caustic and hydrogen sulfide. Oxidizing gas that does not diffuse into the liquid may exit gas diffusion plate 75' by gas outlet 95 and exit the process through oxidation gas outlet 20. Hydroxide ions and polysulfide ions are formed as the oxidizing gas diffuses into the electrolyte solution by the reactions of formulas (1), (4), and (5). In embodiments wherein the oxidizing gas contains sulfur oxide gases, the reduction reactions of formulas (2) and (3) may also occur as the oxidizing gas diffuses into the electrolyte solution through gas diffusion plate 75'. The hydrogen sulfide gas mixes with the electrolyte solution containing polysulfide ions and hydroxide ions thereby causing elemental sulfur to precipitate. Such a reaction is represented by formula (6). In alternative embodiments (not illustrated), precipitated sulfur stream 35 containing sulfur and liquids may be fed to a separator (similar to separator 40 discussed above) in which the elemental sulfur is separated from the liquid. The separated liquid may then be recycled back to sulfur recovery unit 10. The temperature of the electrolyte solution is maintained by suitable methods (e.g., heat exchanger) between about 0° C. and about 200° C., alternatively between about 30° C. and about 150° C., and alternatively between about 30° C. and about 85° C. The electrolyte concentration is maintained between about 0.1 M and about 10 M, alternatively between about 0.5 M and about 8 M, alternatively between about 1 M and about 6 M. The pH value of the electrolyte solution is between about 7 and about 14, alternatively between about 8 and about 12. In an embodiment, the hydroxide ion concentration is maintained between about 0.01 M and about 7 M, alternatively between about 0.1 M and about 4 M, and alternatively between about 0.5 M and about 1.5 M. The oxidizing gas pressure is maintained at a sufficient pressure whereby the gas diffuses into the electrolyte solution, but the electrolyte solution does not diffuse into the porous plate 75'. In an embodiment, the oxidizing gas pressure is from about 0.01 atm to about 50 atm, alternatively from about 0.1 to about 5 atm.

Figure 9:
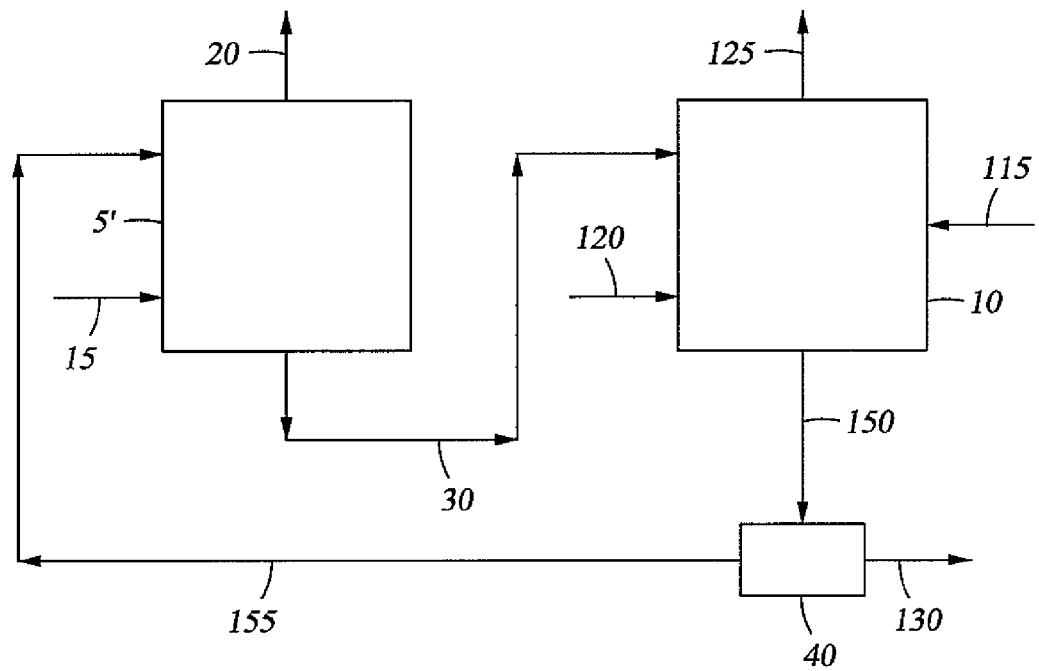
FIG. 9 illustrates an alternate process for the removal of hydrogen sulfide from a hydrogen sulfide containing stream comprising an oxidation unit and a sulfur recovery unit.

FIG. 9 illustrates another alternative embodiment wherein the process for the recovery of sulfur comprises oxidation unit 5', sulfur recovery unit 10, and separator 40. In this alternative embodiment, oxidation unit 5' is not an electrochemical cell but instead comprises a tower packed with electrically conductive catalysts. Oxidation unit 5' comprises a packed tower design suitable for hydrogen sulfide adsorption. The tower is a fluidized bed having any suitable design for sulfide oxidation. Without limitation, examples of suitable designs include bubbling beds, turbulent beds, circulating beds, and the like. The catalysts comprise any materials that are insoluble in a sulfide solution and electrically conductive. The catalytic material may be carbon (e.g., graphite), transition metals, transition metal oxides, transition metal sulfides, lead, bismuth, antimony, metal nitrides, electronically conductive organic polymers, or combinations thereof. Without limitation, examples of transition metals include nickel, cobalt, titanium, molybdenum, platinum, gold, silver, or combinations thereof. Examples of suitable transition metal oxides include without limitation CoO, NiO, $TiO_2$, or combinations thereof. Examples of suitable transition metal sulfides include without limitation CoS, $TiS_2$, $MoS_2$, CuS, FeS, or combinations thereof Examples of metal nitrides include without limitation titanium nitride and boron nitrides. Examples of electronically conductive polymers include without limitation polyaniline and polythiophenes. The catalyst can be supported or unsupported. In embodiments wherein the catalyst is supported, examples of suitable supports include without limitation carbon and/or alumina. In some embodiments, the catalyst may also include a promoter. Examples of suitable promoters include any materials suitable for use as catalytic material in the catalyst.

The following describes an application of the present invention as described in FIG. 9. Caustic solution and hydrogen sulfide are fed to sulfur recovery unit 10 by caustic feed 115 and hydrogen sulfide feed 120, respectively. The caustic solution and hydrogen sulfide mix and at least a portion of the resulting mixture is removed from sulfur recovery unit 10 as separator feed 150 and fed to separator 40. As discussed in the embodiments above, separator 40 is operated under conditions sufficient for separating precipitated sulfur from the liquid in the feed. It is to be understood that in the initial start-up of the system that small amounts or no sulfur will be precipitated and substantially all of separator feed 150 will be liquid and fed to oxidation unit 5' in liquid solution feed 155.

As further illustrated in FIG. 9, the oxidizing gas is fed by oxidation gas feed 15 to oxidation unit 5' at any point before or after introduction of the liquid solution into oxidation unit 5'. In an embodiment, oxidizing gas is not fed until the catalyst bed is sufficiently fluidized by the liquid solution. The oxidizing gas is fed at a pressure from about 0.1 atm to about 50 atm, alternatively from about 1 atm to about 10 atm. Oxidation unit 5' is operated under conditions sufficient for the oxidation of sulfide ions and the formation of hydroxide ions. For instance, the solution temperature in oxidation unit 5' is maintained between about 0 and 200° C., alternatively between about 30 and 150° C., and alternatively between about 50 and about 90° C. In oxidation unit 5', the liquid solution containing sulfide ions is sufficiently mixed with the oxidizing gas (e.g., oxygen) and catalyst particles. The mixing is sufficient to oxidize the sulfide ions into sulfur on the surface of the catalyst particles. The resulting sulfur is then dissolved back to the liquid solution as polysulfide ions. The net ionic reaction in oxidation unit 5' is represented by formula (5). It is to be understood that sulfur oxides can also be converted by including them in the oxidizing gas geed 15 and reacting them with the sulfide ions and catalysts. Such reactions are represented by formulas (2) and (3). A portion of the liquid solution containing the polysulfide and hydroxide ions is removed from oxidation unit 5' and fed to sulfur recovery unit 10 by polysulfide feed 30. The oxidizing gas fed to oxidation unit 5' is regulated to maintain a hydroxide ion concentration in polysulfide feed 30 at between about 0.01 M and about 7 M, alternatively between about 0.1 and about 4 M, and alternatively between about 0.5 and about 1.5 M. In sulfur recovery unit 10, polysulfide feed 30 is mixed with hydrogen sulfide gas introduced by hydrogen sulfide feed 120. Polysulfide feed 30 and hydrogen sulfide feed 120 may be fed at any location to sulfur recover unit 10. In an embodiment, polysulfide feed 30 is fed at the top of sulfur recovery unit 10, and hydrogen sulfide feed 120 is fed at the bottom of sulfur recovery unit 10. By such mixing, hydrogen sulfide reacts with hydroxide ions to form water. By forming water, the pH value of the electrolyte solution is reduced. In addition, elemental sulfur is precipitated from the solution. Without being limited by theory, it is believed that reducing the pH value may cause precipitation of the sulfur. The reaction of the hydrogen sulfide gas with the hydroxide ions is represented by formula (6). The caustic solution feed is regulated to maintain a liquid solution concentration in the process (e.g., in both oxidation unit 5' and sulfur recovery unit 10) between about 0.1 M and about 10 M, alternatively between about 0.5 M and about 8 M, and alternatively between about 1.0 M and about 6 M. Caustic feed 115 is also regulated to maintain the liquid solution feed 155 from sulfur recovery unit 10 to oxidation unit 5' at a pH above about 7, alternatively above about 8. In addition, the caustic feed 115 is regulated to maintain the liquid solution pH in polysulfide feed 30 at about 12 or higher, alternatively about 13 or higher.

Further referring to the application of the embodiment illustrated in FIG. 9, the precipitated sulfur is removed from sulfur recovery unit 10 by separator feed 150 along with the liquid solution of sulfur recovery unit 10. The separated liquid solution is then fed to oxidation unit 5' in liquid solution feed 155. The elemental sulfur is removed from separator 40 as sulfur product 130. Product gas may also be produced in sulfur recovery unit 10 and removed in product gas stream 125. The product gas is substantially free of sulfur.

To further illustrate various illustrative embodiments of the present invention, the following examples are provided.

EXAMPLE 1

Figure 10:
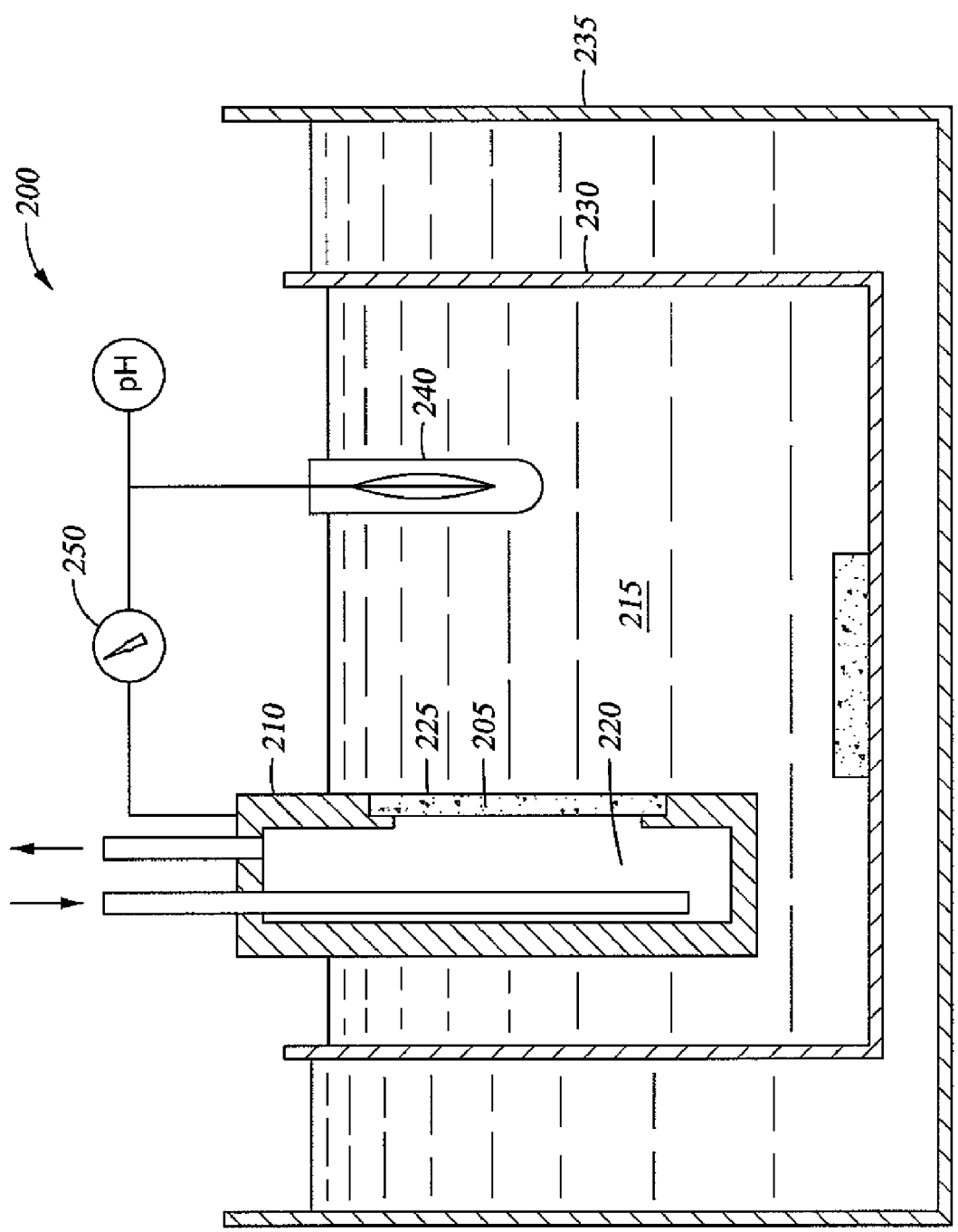
FIG. 10 illustrates an experimental set-up of a process for oxidizing sulfide ions to polysufide ions and simultaneously producing hydroxide ions comprising a gas diffusion plate and solution container.

FIG. 10 represents the process diagram with electrode assembly 200 for Example 1. A gas diffusion cloth 205 was glued on a graphite plate 210 with an electrically conductive adhesive. The gas diffusion cloth was commercially available as A-7 ELAT/DS/INC/V2.1 from E-Tek, and the adhesive was a mixture of electronically conductive carbon black and LOCTITE epoxy. LOCTITE is an epoxy that is commercially available from Loctite Corp. Electrode assembly 200 was immersed in a 1 M $Na_2S$ solution 215. The area for air diffusion was about 4.5 $cm^2$, and the dimension of graphite plate 210 was 2×4.3×0.6 cm. The gas diffusion cloth 205 was polymer cloth coated with carbon black and platinum (about 0.5 mg Pt/$cm^2$). The air pressure in the air chamber 220 was controlled at about 1.25" of water so that air would not form bubbles on the liquid side 225. The $Na_2S$ solution 215 and electrode assembly 200 were contained in a vessel 230 that was immersed in a water bath 235. The water bath temperature was controlled at about 50° C. The assembly 200 also included a Ag/AgCl reference electrode 240.

As the air passed through air chamber 220, the electrode potential of the graphite plate 210 and the pH value of the solution were simultaneously recorded. After 6 hours of passing air through chamber 220, the solution was poured out from the container 230. The total amount of hydroxide ions was analyzed using a conventional titration method, and the amount of elemental sulfur generated was determined by precipitating out the sulfur with hydrochloric acid.

Two tests were run under the following conditions: electrochemical cell temperature of 50° C., air flow rate of about 19 ml/min, testing period of 6 hours, and about 150 ml of solution. Test 1 was performed by bubbling air in the solution with a plastic tube instead of electrodes to set the baseline. Test 2 was performed using the catalytic air-diffusion electrode. Table 1 below shows the results from the two tests.

TABLE I

| Test No. | Sulfur Obtained (g) | $OH^-$ Concentration (M) | Electrode |
|---|---|---|---|
| 1 | 0.08 | — | Not Used |
| 2 | 1.21 | 0.727 | Pt-Catalytic Electrode |

Obtaining 1.21 g of sulfur and increasing the hydroxide concentration from about 0 M to about 0.727 M shows that the oxidation of sulfide ions to polysulfide ions and the reduction of oxygen to hydroxide ions occurred at the air-diffusion electrode. Therefore, tests 1 and 2 show that the oxidation of sulfide ions with oxygen gas in an aqueous solution yields both polysulfide and hydroxide ions at the presence of the electrode. It is also shown that the oxidation goes through the electrochemical processes on the catalytic electrode surface, and the neutralization of a caustic polysulfide solution resulted in precipitation of elemental sulfur. Moreover, it shows that oxygen gas had little reaction with sulfide ions in the liquid phase at the absence of the electrode.

EXAMPLE 2

The experimental set-up and conditions were similar to that of EXAMPLE 1 except solution temperature. Two tests (3 and 4) were run using a non-catalytic air-diffusion electrode, instead of the catalytic gas diffusion carbon cloth. A non-catalytic air-diffusion carbon cloth was commercially available as A-7 ELAT/DS/INC/V2 from E-Tek. In addition, the area for air diffusion was 2.4 $cm^2$, and the dimension of the graphite plate 210 was 2.9×4.5×0.8 cm. In addition, the reference electrode 240 was not used. Test 3 was run at 25° C., and test 4 was run at 50° C. The following Table II shows the results of tests 3 and 4.

TABLE II

| Test No. | Sulfur Obtained (g) | $OH^-$ Concentration (M) | Solution Temperature |
|---|---|---|---|
| 3 | 0.15 | 0.059 | 25 |
| 4 | 0.50 | 0.194 | 50 |

The results show that the oxidation of sulfide ions to polysulfide ions and the reduction of oxygen to hydroxide ions occurred at the air-diffusion electrode without a platinum catalyst. In addition, the data shows that the conversion rate of sulfide ions increased with increasing solution temperature.

EXAMPLE 3

5 grams of lithium sulfide was dissolved in 100 ml of water at room temperature. The lithium sulfide was formed by bubbling hydrogen sulfide gas through lithium hydroxide. 10 grams of manganese dioxide was then added to the lithium sulfide solution. As a result, sulfide ions in the solution were oxidized to form polysulfide ions, and the solution became more caustic. The reaction can be expressed as follows:

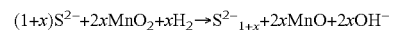

$$(1+x)S^{2-} + 2xMnO_2 + xH_2 \rightarrow S^{2-}{}_{1+x} + 2xMnO + 2xOH^-$$

The manganese dioxide was reduced to manganese oxide and remained as a solid in the alkaline solution.

After the reaction, the liquid and solid particles were separated by filtration, which resulted in a brownish solution that indicated the presence of polysulfide ions. Sufficient hydrochloric acid was added to the polysulfide solution. Immediately, sulfur solid precipitated out from the solution. The resulting solid sulfur was collected by filtration and dried at 40° C. under vacuum for 3 hours. A total of 2.08 g of dry elemental sulfur was obtained.

The results indicated that both polysulfide and hydroxide ions were simultaneously formed in the oxidation reaction of sulfide ions by an oxidizer such as metal oxides and oxygen gas. In addition, the resulting elemental sulfur remained as polysulfide ions in the solution. Moreover, lowering the pH value of a caustic polysulfide solution brought about precipitation of solid elemental sulfur. The results further show that insoluble solid particles such as metal oxides were used to enhance the oxidation of sulfide ions without consumption of the solid particles.

EXAMPLE 4

The experimental setup for Example 4 is shown in FIG. 10. Two electrodes were immersed in 1 M $Na_2S$ solution, which was formed by absorbing $H_2S$ gas into a NaOH solution. The gas diffusion electrode was made of carbon black on carbon cloth without any metal catalysts. The projected area of the air electrode was about 3 $cm^2$. The air pressure in the chamber 220 was controlled at about 3" of water. The water bath 235 temperature was controlled at 52° C.

The graphite and air electrode was connected to an electronic loader 250 that was programmed to either supply or draw the power to/from the cell. At open circuit, the cell voltage was about 0.3 volts. When a current of 80 mA was passed across the cell, the cell voltage dropped to nearly zero. After about 14 hours of passing 80 mA, the $Na_2S$ solution 215 became lightly brownish, indicating the formation of polysulfide ions.

The electrodes were then removed from the cell. In addition, sufficient hydrochloric acid was added to the solution. Elemental sulfur precipitated out of the solution, which was then collected by filtration as described in Example 3. The total amount of dried elemental sulfur was 1.3 g.

The amount of sulfur precipitated would be 0.67 g if oxygen reduction occurred at the air diffusion electrode and no sulfide oxidation took place at the air electrode, according to the following formula.

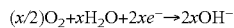

$(x/2)O_2 + xH_2O + 2xe^- \rightarrow 2xOH^-$

However, the amount of sulfur obtained was about twice as much as that based on the formula. Such a result was obtained because oxygen reduction in an alkaline medium went through peroxide ions ($HO_2^-$). As peroxide ions are very active, they may instantaneously react with sulfide ions to form polysulfide ions.

Because the cell voltage was nearly zero at the above current, the cell was operated equivalently under the condition of short-circuit between the two electrodes. The electrode has surfaces that contact both the sulfide solution and oxygen gas. In addition, the oxygen gas has enough driving force to oxidize sulfide ions to sulfur that subsequently combine with sulfide ions to form polysulfide ions.

The results indicated that oxidation of sulfide ions by oxygen gas in an aqueous solution yielded both polysulfide and hydroxide ions. In addition, oxygen reduction went through the formation of peroxide ions that subsequently reacted with sulfide ions to polysulfide ions. Moreover, neutralization of a caustic polysulfide solution resulted in precipitation of elemental sulfur.

Although the present invention and its advantages have been described in detail, it should be understood that various changes, substitutions and alterations may be made herein without departing from the spirit and scope of the invention as defined by the appended claims.

What is claimed is:

1. A process for the removal of hydrogen sulfide from a hydrogen sulfide containing stream, comprising:
    (A) mixing hydrogen sulfide gas with a caustic solution, to form a sulfide ion containing solution;
    (B) feeding the sulfide ion containing solution to an oxidation unit;
    (C) feeding an oxidizing gas to the oxidation unit;
    (D) contacting the sulfide ion containing solution with the oxidizing gas under sufficient conditions to form a polysulfide solution comprising polysulfide ions and hydroxide ions; and
    (E) mixing the polysulfide solution with hydrogen sulfide gas under conditions sufficient for absorption of hydrogen sulfide and precipitation of sulfur from the polysulfide containing solution.

2. The process of claim 1, wherein the oxidation unit comprises an electrochemical cell comprising a cathode.

3. The process of claim 2, wherein the process further comprises forming hydroxide ions and polysulfide ions at the cathode.

4. The process of claim 3, wherein the electrochemical cell further comprises an anode, wherein the process further comprises forming polysulfide ions at the anode.

5. The process of claim 4, further comprising
    (F) producing or consuming electricity.

6. The process of claim 5, further comprising controlling current or cell voltage across the oxidation unit.

7. The process of claim 6, wherein the cell voltage is controlled between about −0.5 and about 0.9 volts.

8. The process of claim 4, wherein at least a portion of the polysulfide solution is in contact with the cathode and the anode.

9. The process of claim 2, wherein the cathode comprises a reaction side and a gas diffusion side, and wherein the oxidizing gas is fed to the gas diffusion side, and further wherein the oxidizing gas diffuses through the gas diffusion side to the reaction side at which the hydroxide ions are formed.

10. The process of claim 2, wherein the cathode comprises a liquid channel disposed adjacent a gas channel, wherein an electrode is disposed between the liquid channel and the gas channel.

11. The process of claim 10, wherein the liquid channel contains sulfide ion containing solution and the gas channel contains oxidizing gas, and further wherein the oxidizing gas diffuses through the electrode to the liquid channel where the oxidizing gas contacts the sulfide ion containing solution to form polysulfide and hydroxide ions.

12. The process of claim 11, wherein the cathode comprises a plurality of liquid channels and gas channels, and wherein each liquid channel is adjacent a gas channel, and further wherein an electrode is disposed between at least a portion of the adjacent liquid and gas channels.

13. The process of claim 1, wherein the precipitation of sulfur is simultaneous with the mixing of the polysulfide solution and the hydrogen sulfide.

14. The process of claim 1, wherein the oxidation unit is disposed within a scrubber.

15. The process of claim 14, wherein the scrubber comprises a polysulfide solution concentration of between about 0.1 M and about 10 M.

16. A process for removal of hydrogen sulfide from a hydrogen sulfide containing stream, comprising:
(A) sulfide ion containing solution is formed in the scrubber by mixing hydrogen sulfide gas with a caustic solution;
(B) feeding a sulfide ion containing solution to an electrochemical cell comprising a cathode;
(C) feeding an oxidizing gas to the electrochemical cell under sufficient conditions to form a polysulfide solution comprising polysulfide ions and hydroxide ions;
(D) transferring the polysulfide solution to the scrubber; and
(E) mixing the polysulfide solution in the scrubber with a hydrogen sulfide containing gas under conditions sufficient for absorption of hydrogen sulfide and precipitation of sulfur from the polysulfide solution.

17. The process of claim 16, further comprising forming hydroxide ions and polysulfide ions at the cathode.

18. The process of claim 17, wherein the electrochemical cell further comprises an anode, wherein the process further comprises forming polysulfide ions at the anode.

19. The process of claim 18, further comprising
(F) producing or consuming electricity.

20. The process of claim 19, wherein step (F) further comprises controlling the current or the cell voltage across the electrochemical cell.

21. The process of claim 20, wherein the voltage of the electrochemical cell is between about −0.5 volts and about 0.9 volts.

22. The process of claim 16, wherein at least a portion of the polysulfide solution is in contact with the cathode.

23. The process of claim 16, wherein the cathode comprises a reaction side and a gas diffusion side, and wherein the oxidizing gas is fed to the gas diffusion side, and further wherein the oxidizing gas diffuses through the gas diffusion side to the reaction side at which the hydroxide and polysulfide ions are formed.

24. The process of claim 23, wherein the reaction side comprises catalytic or non-catalytic material.

25. The process of claim 24, wherein the catalytic material comprises a precious metal, transition metal, transition metal oxide, transition metal sulfide, lead, bismuth, antimony, or combinations thereof.

26. The process of claim 23, wherein the cathode comprises a gas permeable substrate.

27. The process of claim 26, wherein the substrate comprises carbon, graphite, metal, metal alloys, metal oxides, metal sulfides, metal nitrides, electronically conductive polymer or combinations thereof.

28. The process of claim 23, wherein the gas diffusion side comprises a hydrophobic material.

29. The process of claim 16, wherein the cathode comprises a liquid channel disposed adjacent a gas channel, wherein an electrode is disposed between the liquid channel and the gas channel.

30. The process of claim 29, wherein the liquid channel contains sulfide ion containing solution and the gas channel contains oxidizing gas, and further wherein the oxidizing gas diffuses through the electrode to the liquid channel where the oxidizing gas contacts the sulfide ion containing solution to form polysulfide and hydroxide ions.

31. The process of claim 30, wherein the cathode comprises a plurality of liquid channels and gas channels, and wherein each liquid channel is adjacent a gas channel, and further wherein an electrode is disposed between at least a portion of the adjacent liquid and gas channels.

32. The process of claim 16, wherein the concentration of the polysulfide solution in the electrochemical cell is between about 0.1 M and about 10 M.

33. The process of claim 16, wherein the pH of the polysulfide solution is above about 7.

34. The process of claim 16, wherein the precipitation of sulfur is simultaneous with the mixing of the polysulfide solution with the hydrogen sulfide.

35. The process of claim 16, wherein a liquid solution containing the precipitated sulfur is removed from the scrubber and fed to a separator, and wherein the sulfur is separated from the liquid solution in the separator.

36. The process of claim 35, wherein the liquid solution is fed to the electrochemical cell.

37. A process comprising:
(A) forming a sulfide ion containing solution in a scrubber by mixing hydrogen sulfide gas with a caustic solution;
(B) feeding a sulfide ion containing solution to an oxidation unit comprising a catalytic bed;
(C) feeding an oxidizing gas to the oxidation unit;
(D) contacting the oxidizing gas with the sulfide ion containing solution in the oxidation unit under sufficient conditions to form polysulfide and hydroxide ions;
(E) transferring polysulfide solution containing polysulfide ions and hydroxide ions from the oxidation unit to a the scrubber;
(F) mixing the polysulfide solution in the scrubber with a hydrogen sulfide containing gas under conditions sufficient for absorption of hydrogen sulfide and precipitation of sulfur from the polysulfide solution;
(G) removing a liquid solution containing the precipitated sulfur from the scrubber and feeding the liquid solution to a separator, wherein the sulfur is separated from the liquid solution; and
(H) feeding the liquid solution to the oxidation unit.

38. The process of claim 37, wherein the catalyst comprises an electronically conductive material comprising carbon, a transition metal, a transitional metal oxide, a transition metal sulfide, lead, bismuth, antimony, a metal nitride, an electronically conductive organic polymer, or combinations thereof.

39. The process of claim 37, wherein the polysulfide solution comprises a pH at least about 8.

40. The process of claim 37, wherein the liquid solution comprises a pH above about 7.

* * * * *

UNITED STATES PATENT AND TRADEMARK OFFICE
CERTIFICATE OF CORRECTION

PATENT NO. : 7,378,068 B2  Page 1 of 1
APPLICATION NO. : 11/141915
DATED : May 27, 2008
INVENTOR(S) : Mao et al.

It is certified that error appears in the above-identified patent and that said Letters Patent is hereby corrected as shown below:

Column 18, claim 37, line 38, delete "a".

Signed and Sealed this

Nineteenth Day of August, 2008

JON W. DUDAS
*Director of the United States Patent and Trademark Office*